United States Patent

[11] 3,527,141

[72] Inventor Jerry A. Peoples
2419 Greenhill Drive NE., Huntsville
Alabama 35810
[21] Appl. No. 749,534
[22] Filed Aug. 1, 1968
[45] Patented Sept. 8, 1970

[54] VALVING SYSTEM FOR RECIPROCATING ENGINE
9 Claims, 1 Drawing Fig.
[52] U.S. Cl. ....................................... 91/184,
91/191, 91/402, 91/447
[51] Int. Cl. ............................................ F01l 21/02,
F15b 13/42, F15b 15/22

[50] Field of Search.........................................91/184,
183, 191, 189 (Cursory)

[56] References Cited
UNITED STATES PATENTS
| | | | |
|---|---|---|---|
| 598,355 | 8/1897 | Knight........................... | 91/184 |
| 2,442,101 | 5/1948 | Stone ............................ | 91/184 |

*Primary Examiner*—Paul E. Maslousky
*Attorney*—C. A. Phillips

ABSTRACT: A reciprocating engine wherein two spool valves are used to commutate the engine, one controlling gas cut-off and the other providing pressure polarity.

Patented Sept. 8, 1970
3,527,141
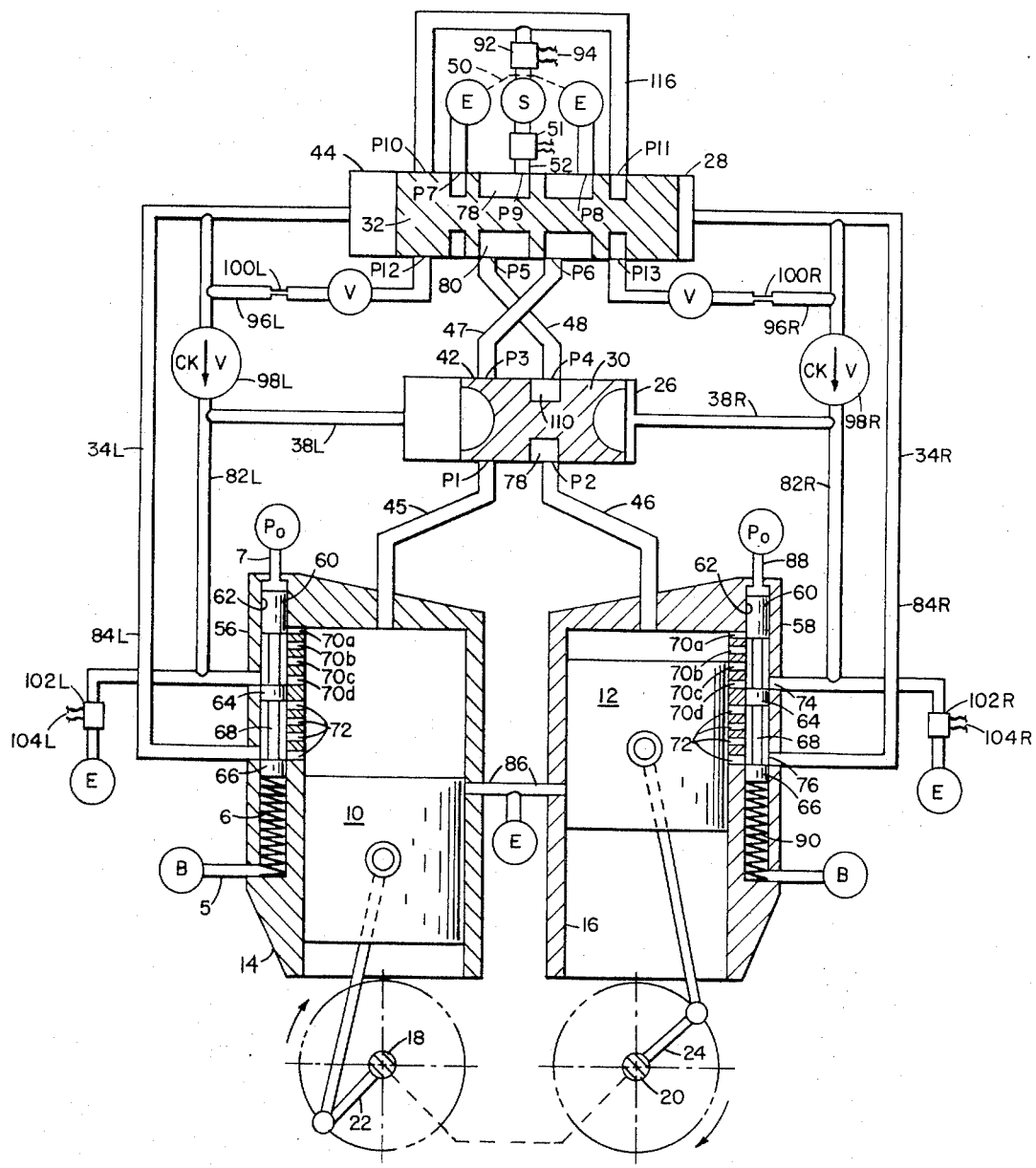
Jerry A. Peoples,
INVENTOR
BY
Charles A. Phillips
ATTORNEY

VALVING SYSTEM FOR RECIPROCATING ENGINE

This invention relates to reciprocating engines and particularly to reciprocating engines which are designed to operate on the Rankine cycle or equivalent. The working medium may be any gas of organic or inorganic origin.

Historically, engines of this type have been known as steam engines. Heretofore in this type engine, steam flow has been directed by some form of mechanically operated valve driven by an eccentric. Such valves and valve drives have taken many forms and are known primarily by the name of the inventor. Some of the more familiar ones are Baker, Corliss, Joy and Walschaerts. All of these systems required an eccentric, and/or a combination of levers and pivot points to provide simple harmonic motion to an end lever. The end lever is fixed to the valve by way of a packing gland. Such a type valving system, historically known as the "valve gear", provided three functions. First, it allowed throttling of the supply pressure. This was primarily a technique for speed control. Second, the "valve gear" established the portion of the piston stroke during which steam was admitted to the cylinder. The point at which steam is cut-off from entering the cylinder is known as "cut-off". A 50 percent "cut-off" is to be interpreted as: steam admission up to 50 percent of the piston stroke. Third, the "valve gear" commutated the flow of steam into the cylinder. Commutation is opening and closing the valve at the proper time and in the proper sequence in order to accommodate admission, cut-off, expansion, and exhaust of the steam.

Inherently, many of the prior valving systems limited operating pressure and temperatures, increased engine volume and complexity, and wasted steam by leakage through packing glands.

The object of the present invention is to overcome the aforesaid difficulties and to provide an improved valving system or "valve gear" for reciprocating engines having an external pressure source.

In accordance with this invention, an engine would normally have four, six or more cylinders. While two cylinders will operate, as shown in the drawings for ease of illustration, a dead center situation can occur. This would require auxiliary means of moving the engine off of dead center, for purposes of starting. Two spool valves are used for each set of oppositely acting pistons of the engine, that is pistons which are connected to a common crank shaft at 180° points by their connecting rods. The first of these spool valves provides two alternately opened and closed channels, one channel being in a pressure supply-exhaust channel to one of the cylinders and the other channel being in a pressure supply-exhaust channel to the other cylinder. In one operating position a first of these channels is open and the second channel closed and in a second operating position the second channel is opened and the first channel closed. The second spool valve also has two operating positions and when operated to a first position it couples a gas pressure to one of the channels of the first spool valve and an exhaust port to the other channel and when operated to a second position the exhaust and pressure connections are reversed to the first spool valve. In other words, with the piston of the first spool valve in a position to complete or open a channel from one of the cylinder assemblies, that cylinder assembly is selectively coupled to either a pressure or an exhaust condition to apply pressure or to permit its exhaust. The spool valves are controlled by stroke positions of the pistons of the power cylinders of the engine and in accordance with one feature of this invention the power cylinders are provided with ports along a direction of piston travel and by means of a three land spool valve, one valve for each cylinder, control pressures for operating first and second spool valves are selectively obtained to commutate the engine at selected points of cut-off.

Reversal of the engine is obtained by providing auxiliary means for operating the second spool valve momentarily. As a feature of this invention this is accomplished by providing two additional flow channels alternately operable through the second spool valve, each being connected through an accumulator and orifice to a control means for operating the second spool valve, typically pressure applied to an end of the spool valve.

These and other objects, features and advantages will, become more apparent from the following description when considered together with accompanying drawing which is a diagrammatic illustration of the invention and its operation.

Referring now to the drawing, it is to be noted that operation of the valving system depends upon multi-cylinders in combinations of twos. One such combination is shown in which two pistons, 10 and 12 are located in cylinders or cylinder assemblies 14 and 16. The crank shafts, 18 and 20 have been drawn separately for purposes of clarity, having throws 22 and 24 arranged 180° apart and rigidly attached to each other. The description given herein is for clockwise rotation of the engine as shown by the arrows.

The valving function is accomplished by spool valves 26 (first valve means) and 28 (second valve means), having spool pistons 30 and 32. Both are cylindrical in shape and respond appropriately when a pressure force is applied through channels 34L (left) or 34R (right) (in the case of spool valve 28) or 38L or 38R in the case of spool valve 26. The respective spool pistons slide in fixed and rigid spool sleeves 42 and 44. Each spool sleeve has holes drilled into the wall which accommodate porting. Sleeve 42 has ports P1 and P2 for connecting channels 45 (first coupling means) and 46 (second coupling means), respectively, to the top chamber portion of cylinder 14 and 16 and ports P3 and P4 for connecting channels 47 and 48 to ports P5 and P6 of cylinder 44 of spool valve 28. Sleeve 44 also has exhaust ports P7 and P8 connecting to common exhaust channel 50, inlet port P9, connecting through low speed cut-off valve 51 to pressure source (S) through channel 52, pressure input reverse ports P10 and P11 and reverse outlet ports P12 and P13.

The supply gas under pressure (S) enters through channel 52 from source (S). Channel 50 is an exhaust outlet but is not the primary exhaust outlet as will be explained later. Channel 50 prevents hydrodynamic forces from developing during the return stroke of the pistons. Points marked (E) are all common with the engine exhaust and are also referred to as exhaust port means. Points marked (B) are bleed ports into the water reserve tank. (Not shown). Channels 47 and 48 carry gas to and from spool valve 28. Gas to the cylinder is routed through channels 45 and 46.

On the side of each of cylinders 14 and 16 are smaller spool valve or spool valve cylinders or cylinder assemblies 56 (first valve control means) and 58 (second valve control means), each of which accommodates a three land spool valve piston 60. Lands are noted as 62, 64, and 66. Thus movement of rod 68 constitutes the same movement of the lands. There are two sets of a series of ports, ports 70 including ports 70a—70d and 72 including ports 72a—72d which communicate between inner cylinder walls of cylinders 14 and 16 and cylinders 56 and 58 in which spool valve 60 is capable of sliding. The lower portion of spool valve assembly 56 is referred to in the claims as third valve control means and the lower portion of spool valve assembly 58 is referred to in the claims as fourth valve control means. The top four ports 70 have the capability of varying cut-off as will be explained. The bottom four ports 72 help "lead" the pressurization of a channel 34r or 34l. Pressure "lead" is necessary to compensate for speed variations. Communication between ports 70 and port 74 and between ports 72 and port 76 depend upon the position of spool valve piston 60. In the position shown the spool valve piston 60 has been displaced downward enough just to block off port 70a. Land 64 is in a position that none of ports 72 are blocked. Each of the ports 70 can communicate with port 74 if the particular port in question is not blocked by spool valve 60. Also, each of ports 72 can communicate with port 76 if the second land does not block the port in question.

If we visualize spool valve piston 60 being displaced downward so that port 70b is covered by land 62, then land 64 will cover port 72a. Insofar as operation of the engine is concerned, only the adjacent port to lands 62 and 64 which are not covered become important as will be explained.

The working gas is supplied to the cylinders through channels 45 and 46 which communicate with a channel 47 or 48 when the spool 30 of spool valve 26 is in the proper position to allow gas flow through the volume 78 created by a groove in spool or spool piston 30. The groove dimensions are such that regardless of the position of spool 30, communication between a Channel 47 or 48 and a Channel 45 or 46 can only exist for one side at a time. In the position shown, communication is with the right side. A channel 47 or 48 communicates with channel 52 whenever the spool piston or spool 32 is in the proper position to allow gas flow through volume 80, created by a groove in the spool. In the position shown both spools 30 and 32 are in the extreme right hand position, thus the gas flow to the engine is by way of channel 52, 48 and 46 to cylinder 16. There is no gas flow into the left hand cylinder since spool 30 prevents communication between channels 47 and 45 on the left side and spool 32 prevents communication between channels 47 and 52.

The series of ports 70a—70d, in the cylinder wall communicate through port 74 with channel 82. The communication of these ports with channel 82 depends upon the position of spool 60 and piston 12. In the position shown, the cylinder gases will flow through ports 70b and c, and port 74, pressurizing channel 82. The check valve 98 prevents pressurizing valve 28. Flow through the check valve is in the direction shown. Spool 30 is now moved to the left by pressure on right side of spool 30. In doing so, gas flow will be cut off to channel 46. The size and shape of spool 30 is such that when it moves to the extreme left, channel 46 will be completely cut off and communication between channels 47 and 45 on the left hand side is restored. With spool 30 in the extreme left position an escape route is created for residual gases within the left hand cylinder. This feature is a particular feature of this invention. This escape route is accomplished automatically at the same time that cutoff occurs. Since at this time compression pressures are zero, the engine will be caused to deliver about 3—4 percent more work per revolution, thus increasing power and efficiency. This feature also allows for a design for zero clearance volume which also increases efficiency. Further, if "priming" or excessive condensation occurs within the cylinders there is no danger from hydrodynamic effects. Previous valve gears did not provide the zero clearance feature and only with complications was compression pressure limited to reasonable values. During the entire return stroke of the left hand cylinder, the back pressure is essentially zero.

As the gas expands behind the right piston, the crank turns and the left hand piston moves upward near top dead center. As the right piston moves downward near bottom dead center, communication will be established between one of the ports 72a—72d and port 76. Channel 84R pressurizes, forcing spool 32 to the extreme left position. Communication is cut off from the right side and restored on the left. At this point the left piston 10 is at top dead center and ready to begin its power stroke. At the same time the right piston 12 goes through bottom dead center. In doing so, the spent gases from cylinder 16 escape to the exhaust (E) through port 86.

Only a single port 86 is shown but in practice a series of holes like port 86 are located around the cylinder. The engine is now ready for the same cycle to be repeated on the left hand side.

Engine cut off is controlled by the application of a pressure ($P_o$) through channel 88 to cylinder 58. The pressure ($P_o$) is initially balanced by spring 90 pushing on spool 60. As the pressure is increased land 62 closes off a large number of ports 70. Thus, the piston is required to complete a large percentage of the stroke before a port 70 will be opened by movement of the piston. Cutoff is therefore delayed. In the same manner, channel 84 becomes pressurized at a later time in the period of the stroke since the piston must move further downward to establish communications between a port 72 and a port 76.

This arrangement enhances operation of the engine because the pressurization of Channel 84 takes place at different pressures depending upon cutoff. First, it should be noted that pressurization of channel 82 must necessarily take place at throttle pressure applied by the source (S). This pressure is on the order of 600 to 1000 psia. With these high pressures, an active "lead" control is not warranted. A controlled lead time for channel 84 is required since expansion of the gas can result in a rather low compression pressure in channel 84. Thus for low cutoff, more lead time is available. For high cutoffs, less lead time is available. At low values of cutoff (10 percent or less) the pressurization of channel 84 takes place at a reduced pressure since the gas is required to expand more. This reduced pressure increases the lag time of spool 32. The lands on spool 60 are so placed that at low cutoff maximum lead time is allowed by letting the pressurization of Channel 84 to take place, through the first port. The mechanical construction of spool 60 allows cutoffs up to about 50 percent and pressure leads up to about 90° of the crank.

At larger values of cutoff, 40 percent—50 percent, less lead time is needed because the number of expansions are less which results in a greater cylinder pressure for any crank angle. Also the engine tends to run slower (trades off speed for torque). The pressurization of channel 84 therefore takes place at a higher pressure which necessitates less delay. The required delay associated with larger cutoffs is automatic because land 64 lowers the point through which communication can take place through port 76. As shown, spool 60 represents a low cutoff, however for a higher value of cutoff channel 84 may not become pressurized until the piston passes port 72a. Pressurization of channels 84 and 82 causes no transients on spool 60 since lands 62, 64 and 66 are all of the same diameter. Therefore, pressurization of channel 88 changes the cutoff and at the same time changes the lead time required for actuation of spool 30, resulting in a properly pressure commutated engine. The character of pressure in channel 88 is summarized as follows:

1. A low or zero pressure in channel 88 necessitates a short cutoff and results in a greater pressurization time for channel 84.

2. A high pressure in channel 88 necessitates a long cutoff, and results in less time for pressurization of channel 84.

Operation of Rankine Cycle engines requires that low or short cutoff be associated with high speeds and long cutoffs be associated with low speed. In practice, control pressure ($P_o$) would be made to increase as speed decreased and vice versa.

Operation is commenced by operating solenoid valve 51 "on". Upon activation of solenoid valve 51, and spool 32 being initially as shown, vapor flows from channel 52 through port P9, to cavity 80 of spool or piston 32, then out port P5 and through channel 48 to spool valve 26. There, with spool piston 30, as shown, vapor passes through port P4 to cavity 110 and then out port P2 and through channel 46 into right cylinder assembly 16.

As the gas expands above piston 12, it moves down causing cranks 24 to be turned clockwise. Since cranks 22 and 24 are coupled, crank 22 is also turned and piston 10 is moved upward toward top dead center. As the top of right piston 12 passes port 70b, part of the cylinder gases escape through port 70b into channel 74. This action pressurizes channels 82R and 38R, driving spool 30 to the extreme left, cutting off ports P2 and P4 and thus cutting off vapor input to cylinder 16. In this manner vapor cutoff is achieved at a point corresponding to a selected position, in this case at a point corresponding to the position of port 70b.

As piston 12 approaches the bottom of its stroke, the top of piston 12 slides past a series of port openings 72a—72d similar to ports 70a—70b, the first one being port 72a. This movement allows vapor to flow out through port 76 and causes channel 84R to become pressurized at a predetermined position of piston 12. Cylinder pressure now acts on the right end of piston 32, forcing it to the extreme left position which switches the pressure polarity from right cylinder 16 to left cylinder 14. During the initial portion of the up-stroke of piston 10, and with piston 30 positioned to the left, residual vapor in cylinder 14 exhausts up through channel 45, cavity 110, channel 47, and cavity 79 to exhaust (E). At this point, the left piston is near top dead center and ready to begin its power stroke. At the same time, right piston 12 is near bottom dead center and spent gases escape to exhaust (E) through port 86.

Left cylinder 14 is now operated as follows. Vapor is applied through channel 52 and port P9 to cavity 79. It then passes through port P6, channel 47, and port P3 to cavity 110. With ports P3 and P1 now connected, vapor continues through port P1 and channel 45 to the top input of cylinder 14. This causes piston 10 to move downward until a port, 70b, is uncovered, pressurizing channel 82L. This causes spool 30 to be forced back to the right (position shown) and cutoff vapor flow to cylinder 14. This movement also completes a communication passage from the top of cylinder 16, through channel 46, port P2, cavity 110, channel 48, cavity 78 to exhaust (E) to relieve compression pressure in right cylinder 16, permitting residual gases to escape. As left piston 10 moves downward toward bottom dead center, channel 84L becomes pressurized as a result of the left piston sliding past left port 72a. Pressurization of channel 84L forces spool 32 back to the extreme right position (shown) to complete the cycle.

Reversing of the engine is a matter of changing the pressure polarity between the two cylinders. This is accomplished by displacing spool 32 in the opposite direction to that of the previous movement. Spool 30 is also reversed if cutoff has not occurred. This stipulation on spool 30 is required since spool 30 always leads spool 32. If cutoff has occurred, spool 32 is already in the proper position for pressure polarity reversal. Reversal can therefore be accomplished by an auxiliary means to pressurize channels 84 and 82 during any part of the cycle.

It is noted that a certain pressure polarity is also required for reversing. For example if channels 84 and 82 left were pressurized (external) no reversal would take place since both spools are already in the right position. The necessary logic or intelligence to know which side should be pressurized is carried in the position of spool 32.

Pressurization of Channels 84 and 82 should take place on the same side as spool 32 has been displaced. Solenoid valve 92 is a pulse operated solenoid valve which is opened only momentarily to pressurize channel 116 upon application of an energizing potential to terminals 94. Depending upon the position of spool 32 the accumulator or volume (V) right or left is pressurized. In the position shown the right volume (V) pressurizes. After pressurization of volume (V), solenoid 92 is closed. The trapped gas flows through channel 96 in order to reverse the positions of spool 30 and 32. If cutoff has already occurred pressurization of channel 82 is surplusage. Upon pulsing valve 92, pressurization of Volume (V) on the left side is prevented since the position of spool 32 prevents communication to volume (V) on the left side. The two check valves 98 R and L prevent back flows of steam during normal operation. The two orifices 100 aid pressurization of the volumes (V). They also restrict flow of vapor from channel 84 during normal operation. During normal operation, channel 84 is depressurized during the exhaust cycle. The reversing sequence requires that these channels be depressurized prior to reversal. This is necessary since trapped gases may restrict the reversing motion. Depressurization of these channels is accomplished by initiating a pulse to a solenoid valve 102 through terminals 104 at the same time solenoid 92 is pulsed. While volume (V) is charging, channels 84 and 82 are depressurized.

Solenoid cutoff valve 51 provides a capability to turn on and shut off steam flow to the engine. Reversing is always initiated after the engine has been stopped.

A pressure operation source located at (S) represents the output of a boiler. The activation of solenoid valve 51 is operated "on" by means not shown. The valve, a solenoid valve, is de-energized whenever the engine speed falls below some pre-determined value by a spool responsive switch which also is not shown. Valve 51 is not a throttle, but rather a low speed cutoff. Engine speed is controlled by the pressure and vapor capacity at (S). Upon activation of the low speed cutoff, solenoid valve 51, the position of spool 32 is such that the vapor flows into channel 52, by way of cavity or volume 78 which is formed by the "lands" on spool 32 and then flows through channel 48 to spool valve 26. Vapor then flows into channel 46 by way of cavity 110 formed by "lands" on spool 30. From channel 46, the vapor is ported into the right cylinder. As the pressure builds within the cylinder a force is created which produces a clockwise rotation of the crank. The initial direction of rotation during start is peculiar to the position of spools 30 and 32. This fact will become clear as the cycle is described.

In the position shown, the right piston has moved downward past port 70C. At this instant, part of the cylinder gases has escaped through this port and through port 74. The gases flow into channel 82, pressurizing the cavity at the right end of spool 30. As spool 30 is forced to the left the body of spool 30 prevents communication between channels 48 and 46 rights. Thus, the vapor is trapped within the cylinder, and the supply vapor is "cutoff". Expansion of the trapped gases forces the piston through the remaining portion of its stroke. The portion of the piston stroke during which vapor enters, or "cutoff" can be adjusted by increasing the pressure at ($P_0$) positioning spool 60 at a lower level. As ($P_0$) is increased, successive ports, 70a, b, c, etc., become closed off by "land 60" on spool 60. Thus, the piston must move a larger percentage of its stroke before communication can be completed between a port 70 and port 74. The movement of spool 30 produces vapor cutoff. As a feature of this invention, cutoff can be varied between zero and 50 percent. By staggering ports 70, essentially infinitely variable cutoff can be realized. For automotive application of the system, cutoff greater than 50 percent is not required.

As spool 30 is displaced to the extreme left, communication is established between channels 47 and 45. Concurrent with this, the left piston is moving upward. Pressure buildup is prevented in left cylinder 16 since any residual vapor can easily escape through channels 45 and 47, through spool valve 28 and out the exhaust channel or port 50. Studies show that up to about 5 percent more horsepower is available as a result of zero back pressure. This advantage is coupled with the fact that, theoretically, the clearance volume can be made zero (allowance must be made for manufacturing tolerances and thermal expansion). Previously it was not recognized that a Rankine engine cycle was practical with zero clearance. Historically, auxiliary exhaust valves were employed to limit compression pressures. In this invention this capability is automatic by nature of the design. Any condensation which occurs during start cannot "knock-off-the-heads" since the liquid vapor can also escape through channel 45.

As the right piston approaches the bottom of its stroke, the piston slides past a series of openings of ports 72 similar to ports 70. This movement allows port 76 and channel 84R to become pressurized at a predetermined position of piston 12. This location is controlled by the length of land 64 and the pressure at $P_0$. Cylinder pressure acts on the right end of spool 32, forcing it to the extreme left position. The pressure polarity is thus switched from the right cylinder to the left cylinder. The orifice 100R acts to retard flow during pressurization of channel 84 and little or no flow occurs through this orifice. The primary purpose of orifice 100R is for reversing. However, it also conserves vapor since it prevents channel 116 from becoming fully pressurized.

The movement of spool 30 is not critical, but the movement of spool 32 must be complete when the right piston goes through bottom dead center. To account for the dynamic lag of spool 32 a pressure lead must be instituted to insure synchronization. This capability is also made possible by application of an appropriate pressure at $P_0$. With a relatively low pressure at $P_0$, a low cutoff is incorporated. Low cutoff is associated with high speeds, thus, more lead time is required.

The lead time is adjusted by the position and length of land 64 on spool 60. In the position shown, the first of port 72 communicates with channel 76, thus, the maximum lead time is allowed by the illustration shown. At lower speeds, $P_0$ would be increased giving larger cutoff values and accordingly smaller lead times. The pressure at $P_0$ serves to change cutoff and at the same time compensates for pressure lags. The exact relationship between cutoff and the pressure lead time is governed by design by the length of land 64. No adjustable compensation is required for spool 30 since:
1. By design it has less mass;
2. Larger pressures act on its ends;
3. Lags can be designed in permanently by the length of land 62; and
4. Cutoff is not critical.

The geometry of spool 32 is such that movement to the left switches the residual pressure relief channel from the left piston to the right piston. As a result of cutoff produced by spool 30, the supply vapor flows now through channels 47 and 45 left into the left cylinder. At this point the left piston is at top dead center and the right piston at bottom dead center. As the right piston goes through bottom dead center the piston slides past port 86 allowing exhaust of the expanded gases. This action is the same as uniflow action used on previous steam engines.

The left piston moves downward until a port, which is determined by pressure $P_0$ is uncovered, pressurizing channel 82L. The spool 30 is forced to the right. This movement, completes communication between 46 and 48 right to relieve compression pressure of the right cylinder. The residual gases escape through channel 50. As the left piston moves downward toward bottom dead center, the right piston moves toward top dead center. During this portion of the stroke, channel 84L becomes pressurized as a result of the left piston sliding past ports 72 left. Pressurization of channel 84 forces spool 32 to the extreme right position. The cycle is then repeated. The movement of spool 30 and 32 is such that vapor is always ported to the cylinder beginning its power stroke. When several pairs of pistons are used they will be in various stages of admission, power and exhaust. Thus, the engine always starts in the same direction which is indicative of the relative positions of spools 32 and 30. This direction can be reversed by reversing the relative positions of spools 32 and 30 in accordance with provisions given herein.

REVERSING DIRECTION

To reverse the engine, the pressure at S is allowed to decrease until the low speed cutoff closes valve 51. Assume that the engine comes to rest in the position shown. It is noted that the pressure at (S) need not approach zero in order to produce a slow speed. In practice (S) would be controlled to a predetermined minimum. Speed control is primarily acquired by limiting the firing rate. The engine is reversed by pulsing electrical solenoid at 92. Vapor flows through channel 116, pressurizing at volume (V) right. Vapor cannot flow into (V) left since spool 32 prevents flow to the left. As (V) right is pressurized, the flow begins to leak through orifice 100, right. In the meantime solenoid 92 closes. The pressure in volume (V) leaks into channel 96 and through the check valve right. Thus, the positions of spools or spool piston 30 and 32 are reversed. If cutoff has already occurred spool 32 will already be in the proper position. With spools 30 and 32 being forced to the left, the pressure polarity is shifted to the left cylinder. Whatever the position of the left piston (the left piston must necessarily be on its exhaust stroke) it will be driven "back downward". At initiation of reverse, vapor will always be directed to the piston which is on its upward stroke. Otherwise, the piston would be at near top dead center and spool 30 is reversed through normal operation. The check valves are designed for abnormal high cracking pressure (100 psi). This still accomodates high pressure bleed from channels 82 and 84 through solenoid 102 and at the same time insures a relatively high reversing pressure on spool 32 in the event a reversing motion is initiated on a cold engine with pistons 10 or 12 in a position such that is communication between 74 and 70.

As solenoid valve 92 is pulsed solenoid valves 102 are pulsed simultaneously. This allows relief of any pressure within the connecting channels which may interfere with the reversing motion. Any vapor escaping through a valve 102 is passed to the exhaust E during this depressurization, orifice 100 right restricts excess flow through valve 102 right. Of course, on the right hand side, depressurization is undesirable since, repressurization is required for reversal. However, this small disadvantage has the advantage of a single activation of a switch for solenoid valves 92 and 102 left and 102 right. It is to be noted that only the opposite side of the side being pressurized needs to be depressurized. Depressurization of the pressurized side is surplusage. The orifices 100L and 100R insure sufficient differential pressure for reversal, after the depressurization cycle is complete.

While this invention has been described in terms of a single example its scope is to be limited only by the following claims.

I claim:
1. A reciprocating engine comprising:
A. first and second cylinder assemblies;
B. first valve means for selectively and responsive to a first control input for permitting gas flow between a first pair of ports, or responsive to a second control input for permitting gas flow between a second pair of ports;
C. first and second coupling channels, said first coupling channel being coupled between a first port of said first pair of ports of said first valve means and said first cylinder assembly, and said second coupling channel being coupled between a first port of said second pair of ports of said first valve means and said second cylinder assembly;
D. second valve means for selectively and responsive to a first control input for permitting gas flow between a source of gas pressure and the second port of said second pair of ports and permitting gas flow between the second port of said first pair of ports and a gas exhaust, or responsive to a second control input for permitting gas flow between a source of gas pressure and the second port of said first pair of ports and permitting gas flow between the second port of said second pair of ports and a gas exhaust;
E. first valve control means responsive to a first pre-determined point on the power stroke of a piston of said first cylinder assembly for providing said first control input to said first valve means;
F. second valve control means responsive to a first predetermined point on the power stroke of a piston of said second cylinder assembly for providing said second control input to said first valve means;
G. third valve control means responsive to a second predetermined point on the power stroke of said first cylinder assembly for providing said first control input to said second valve means;
H. fourth valve control means responsive to a second predetermined point of a power stroke of a piston of said second cylinder assembly for providing said second control input to said second valve means; and
I. exhaust port means connected to each of said cylinder assemblies for releasing gas at a pre-determined point on the power stroke of a piston of each said cylinder assembly.

2. A reciprocating engine as set forth in claim 1 further comprising reversing means comprising auxiliary means for providing either of said first and second control inputs to said second valve means.

3. The engine as set forth in claim 1 wherein said first valve means comprises a totally enclosed spool valve, said spool valve comprising:
A. an elongated housing having a pressure responsive first control inlet at one end and a pressure responsive second control inlet at the other end;

B. a first piston shorter than the internal length of said housing and positioned within said housing and adapted to move along an end-to-end path responsive to inlet control pressures applied to said pressure control inlets for assuming first and second positions;

C. said first piston including a connecting channel and wherein said first pair of ports are connected by said connecting channel when said piston is in said first position, and wherein said second pair of ports are connected when said piston is in said second position.

4. The engine set forth in claim 3 wherein said second valve means comprises a totally enclosed second spool valve, said second spool valve comprising:

A. an elongated housing having a pressure responsive first control inlet at one end and a pressure responsive second control inlet at the other end, exhaust port means, a pressure source input port, and first and second inter valve ports;

B. a second piston shorter than the internal length of said housing and positioned within said housing and adapted to move along an end-to-end path responsive to inlet control pressures applied to said pressure control inlets for assuming first and second positions;

C. said second piston comprising channels for selectively coupling said pressure source input port to said first inter valve port and said second inter valve port to said exhaust port means when said second piston is positioned in a said first position and for selectively coupling only said pressure source input port to said second inter valve port and said first inter valve port to said exhaust port means when said second piston is positioned in a said second position; and D. a first control channel between said first pressure responsive inputs of said first and second valve means and first check valve in said first control channel polarized to permit gas flow only in the direction from said second valve means to said first valve means and a second control channel between said second pressure responsive inputs of said first and second valve means and second check valve in said second control channel polarized to permit gas flow only in the direction from said second valve means to said first valve means.

5. The engine set forth in claim 4 further comprising reversing means wherein:

A. said housing of said second valve means further comprises inlet port means and first and second outlet ports and wherein said second piston further comprises a first reversing channel for selectively coupling said inlet port means to said second outlet port when said second piston is in said first position and a second reversing channel for selectively coupling said inlet port means to said first outlet port when said second piston is in said second position;

B. means for momentarily applying pressure to said inlet port means;

C. first and second accumulators;

D. first and second orifice means for restricting gas flow; and

E. said first accumulator and said first orifice being connected in this order between said first outlet port and said pressure responsive first control inlet of said second valve means and said second accumulator and said second orifice means being connected in this order between said second outlet port and said pressure responsive second control inlet of said second valve means.

6. The engine set forth in claim 4 wherein at least said first cylinder assembly has a series of ports in the cylinder wall, each port corresponding to a different point along the stroke of the piston of that cylinder assembly and said first and third valve control means each include means for selectively covering and uncovering said ports for selectively receiving pressure from said first cylinder at a pre-determined point on the stroke of the piston of said first cylinder assembly.

7. The engine set forth in claim 6 wherein at least said first and third valve control means comprises a third spool valve having a third spool piston in turn having first, second, and third spaced lands pressure for said first control input of said first valve means being provided by said ports of said first cylinder assembly uncovered between said first and second lands and pressure for said first control input of said second valve means being provided by said ports of said first cylinder assembly uncovered between said second and third lands, and means for varying the position of said piston of said third spool valve for determining the point along the stroke of said piston of said first cylinder assembly at which said first and second valve means would be operated.

8. The engine set forth in claim 7 wherein said means for varying the position of said third spool piston comprises means for applying pressure to one end of said third spool piston and includes spring means positioned on the opposite end of said piston of said third spool valve for opposing movement of said third spool piston.

9. The engine set forth in claim 8 further comprising means coupled to at least one of the pressure responsive control inputs to said first valve means for selectively exhausting gas pressure.